(12) United States Patent
Sekizuka (10) Patent No.: US 12,145,483 B2
(45) Date of Patent: Nov. 19, 2024

(54) VEHICLE BACKREST STRUCTURE

(71) Applicant: TOYOTA JIDOSHA KABUSHIKI KAISHA, Toyota Aichi-ken (JP)

(72) Inventor: Makoto Sekizuka, Toyota Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 288 days.

(21) Appl. No.: 17/839,665

(22) Filed: Jun. 14, 2022

(65) Prior Publication Data

US 2022/0402409 A1    Dec. 22, 2022

(30) Foreign Application Priority Data

Jun. 16, 2021    (JP) ................................ 2021-100138

(51) Int. Cl.
  *B60N 2/00*  (2006.01)
  *A61G 3/08*  (2006.01)
  *B60N 2/24*  (2006.01)
  *B60N 3/02*  (2006.01)

(52) U.S. Cl.
  CPC ........... *B60N 2/245* (2013.01); *A61G 3/0808* (2013.01); *B60N 3/02* (2013.01)

(58) Field of Classification Search
  CPC . B60N 2/245; B60N 3/02; A61G 3/08; A61G 3/0808
  See application file for complete search history.

(56) References Cited

U.S. PATENT DOCUMENTS

| | | | | |
|---|---|---|---|---|
| 5,833,267 A | * | 11/1998 | Cordes | A61G 3/0808 280/805 |
| 2011/0204688 A1 | * | 8/2011 | Undevik | B60N 2/245 296/65.04 |
| 2013/0328340 A1 | * | 12/2013 | Bruns | B60N 2/245 296/65.01 |
| 2015/0164716 A1 | * | 6/2015 | Kilduff | A61G 3/0808 410/7 |
| 2020/0113754 A1 | * | 4/2020 | Girardin | A61G 3/0808 |
| 2021/0000668 A1 | * | 1/2021 | Sekizuka | B60R 22/48 |

FOREIGN PATENT DOCUMENTS

| | | |
|---|---|---|
| JP | H03-1859 A | 1/1991 |
| JP | 2012-200321 A | 10/2012 |
| WO | 2015/052515 A1 | 4/2015 |

* cited by examiner

*Primary Examiner* — Steven O Douglas
(74) *Attorney, Agent, or Firm* — Dinsmore & Shohl LLP (57) ABSTRACT

A vehicle backrest structure includes a lateral handrail fixed within a vehicle cabin and extending horizontally, and a backrest having a cushion formed of a soft material and configured to receive a back portion of a wheelchair user in a wheelchair that is supported within the cabin of the vehicle. The backrest has a recessed part that is opened downward and is to be engaged with the lateral handrail. The backrest is configured to be removably supported on the lateral handrail.

5 Claims, 8 Drawing Sheets

VEHICLE BACKREST STRUCTURE

CROSS REFERENCE TO RELATED APPLICATION

This application claims priority to Japanese Patent Application No. 2021-100138 filed on Jun. 16, 2021, which is incorporated herein by reference in its entirety including the specification, claims, drawings, and abstract.

TECHNICAL FIELD

The present disclosure relates to a backrest structure including a backrest to receive a back portion of a wheelchair user sitting in a wheelchair within a vehicle cabin, and particularly to a reduced cost structure which alleviates the impact on the wheelchair user and simplifies attachment/detachment of the backrest.

BACKGROUND

JP H03-1859 A discloses a bus having a seat for a wheelchair user in which a cushion backrest disposed against the back of a user in a wheelchair is supported on the floor with a support pillar. This configuration alleviates impact to the wheelchair user in the event of a sudden start or collision of the bus.

In a vehicle that is accessible to a wheelchair user and includes a backrest that is firmly fixed to the vehicle, the space required for the backrest is wasted when not used by a wheelchair user. Meanwhile, a vehicle including a backrest to be mounted on the vehicle with a fastener such as a screw, requires a time-consuming task of attaching or detaching the backrest with respect to the vehicle. There has also been a demand for reducing the cost of the structure that supports the backrest on the vehicle.

SUMMARY

Embodiments of the disclosure are therefore aimed at providing a lower cost vehicle backrest structure including a backrest that can alleviate the impact on a wheelchair user and that is simply attachable and detachable with respect to a vehicle.

A vehicle backrest structure according to the disclosure includes a lateral handrail fixed within a cabin of a vehicle and extending horizontally, and a backrest having a cushion formed of a soft material, the backrest configured to receive a back portion of a wheelchair user in a wheelchair that is supported within the cabin of the vehicle. The backrest has a recessed part that is opened downward and that is to be engaged with the lateral handrail. The backrest is configured to be removably supported on the lateral handrail.

The backrest of the backrest structure having a cushion is configured to be engaged with the lateral handrail and to receive the back portion of the wheelchair user. The backrest structure can therefore alleviate the impact on the wheelchair user with the backrest in response to a big behavior, such as sudden stop, of the vehicle. Further, the backrest is simply liftable and removable from the lateral handrail, and is also be easily mountable on the lateral handrail by simply engaging the recessed part with the lateral handrail. Also, the lateral handrail can be used for supporting the backrest in the vehicle. This configuration eliminates the need for a specific component that secures the backrest to the vehicle, thereby facilitating cost reduction.

In the vehicle backrest structure, the backrest may include a reinforcing pipe embedded within the cushion and having a downwardly-opened shape along an inner face of the recessed part.

The above configuration facilitates keeping of the recessed part shape with the reinforcing pipe that is embedded within the cushion and opened downward along the inner surface of the recessed part, preventing removal of the backrest from the lateral handrail.

The vehicle backrest structure may further include a handrail reinforcing bracket configured to be fixed between a side face of the lateral handrail facing a wall portion of the vehicle and the wall portion, and having a coupling end with respect to the lateral handrail, extending in a direction orthogonal to an extending direction of the lateral handrail. The backrest has a bracket engaging slot having an opened lower end at a portion to face the wall portion to connect a side end of the backrest to face the wall portion with the recessed part of the backrest, and the bracket engaging slot is configured to be engaged with the coupling end of the handrail reinforcing bracket.

The above configuration prevents movement of the backrest along the extending direction of the lateral handrail by engaging the coupling end of the handrail reinforcing bracket with respect to the lateral handrail with the bracket engaging slot, and also eliminates the need for a specific component in the vehicle that prevents movement of the backrest along the extending direction of the lateral handrail.

In the vehicle backrest structure, the backrest may include a storage portion configured to store a belt that fixes the wheelchair.

The belts not in use can be stored within the storage portion, and the belts and the backrest can be stored collectively when no wheelchair user is going to board the vehicle. This configuration facilitates storage of the belts and preparation for a wheelchair user's boarding.

The vehicle backrest structure of the disclosure includes a backrest to alleviate the impact on a wheelchair user, and simplifies attachment and detachment of the backrest with respect to a vehicle. The vehicle backrest structure can thus achieve cost reduction.

BRIEF DESCRIPTION OF DRAWINGS

Embodiments of the present disclosure will be described based on the following figures, wherein.

DESCRIPTION OF EMBODIMENTS

A backrest structure in a vehicle according to embodiments of the disclosure will be described below. In the following description, specific shapes, materials, numbers, and locations, for example, are illustrative only to facilitate understanding of the disclosure and may be changed as appropriate in accordance with design considerations. In the drawings, arrows F, U, and R indicate frontward, upward, and rightward of the vehicle, respectively. Directions opposite the arrows F, U, and R indicate rearward, downward, and leftward of the vehicle, respectively.

Figure 1:
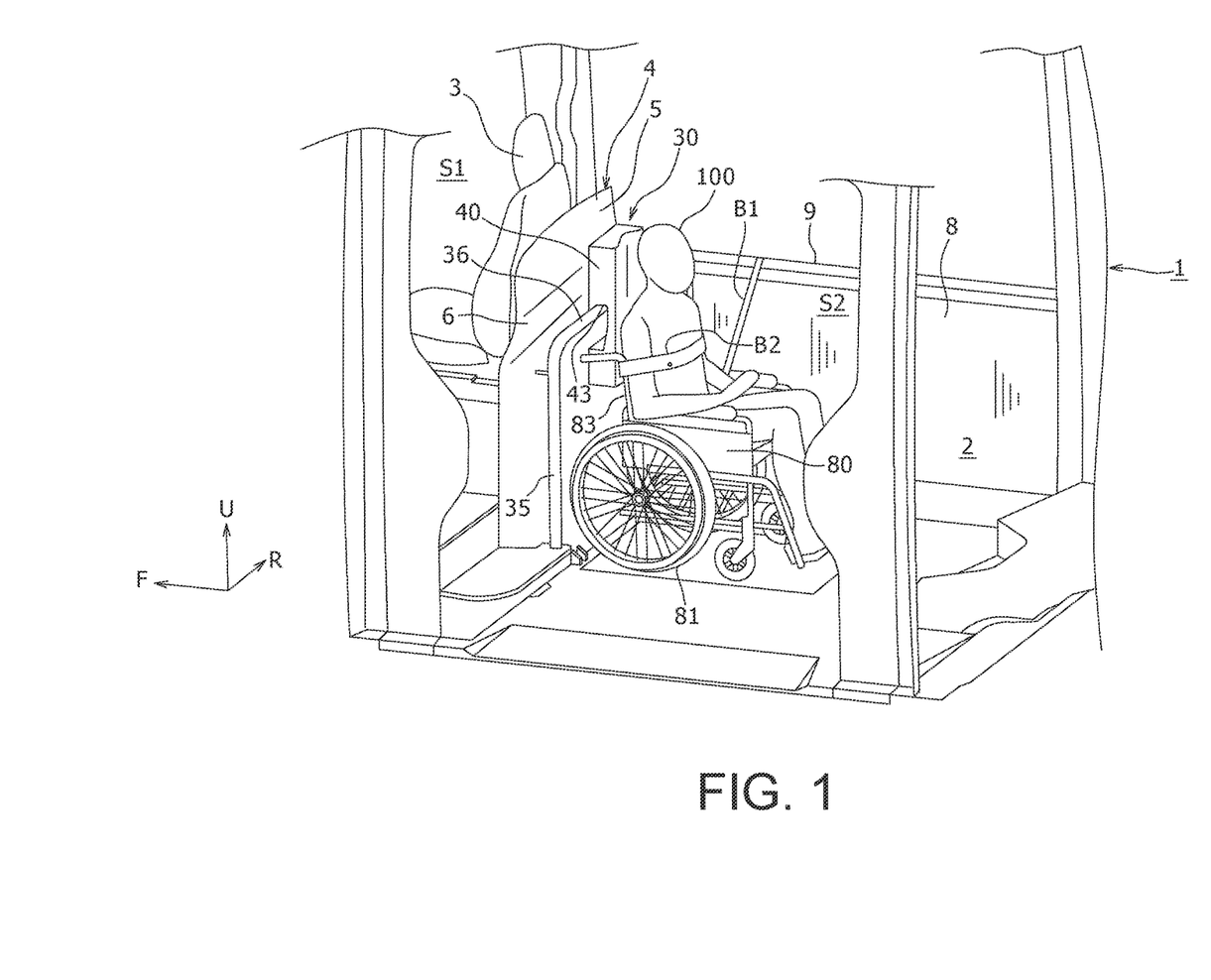
FIG. 1 is a perspective view of a vehicle cabin including a backrest structure according to an embodiment of the disclosure.
Figure 2:
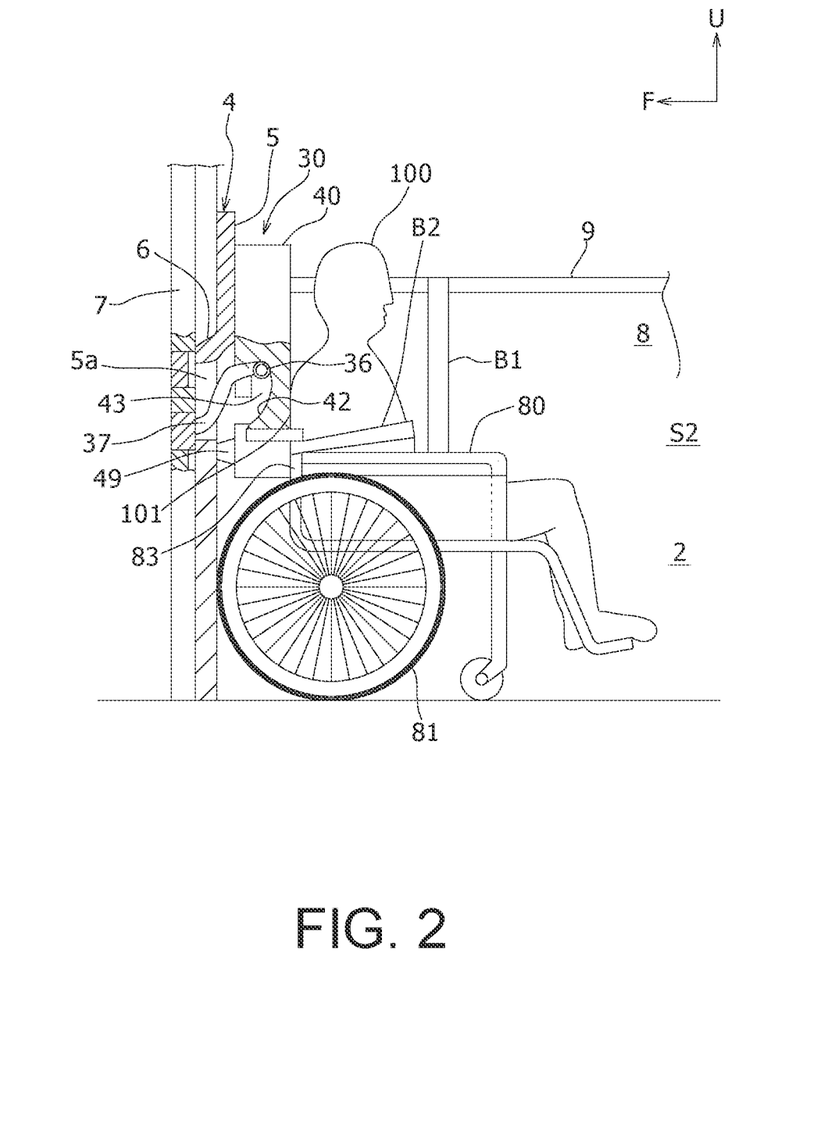
FIG. 2 is a side view of the backrest disposed against the back portion of a wheelchair user in the vehicle cabin of FIG. 1.

FIG. 1 is a perspective view of a cabin 2 of a vehicle 1 including a backrest structure 30 according to an embodiment. FIG. 2 is a side view of a backrest 40 disposed against a back portion 101 of a wheelchair user 100 in the vehicle cabin 2.

The backrest structure 30 is disposed in a bus type vehicle 1 that is an automotive vehicle for passengers. The vehicle 1 is accessible by the wheelchair user 100 in a wheelchair 80. The backrest structure 30 receives the back portion 101 of the wheelchair user 100 with the backrest 40 supported on a lateral handrail 36. The backrest 40 is opened downward, and is removably supported on the lateral handrail 36 with a recessed part 43 of the backrest 40 engaging with the lateral handrail 36. The backrest 40 is thus simply attachable and detachable with respect to the vehicle 1, which achieves a structure that facilitates cost reduction. In the following, the configuration within the cabin 2 of the vehicle 1 will first be described, and then the backrest structure 30 will be described in detail.

The vehicle 1 includes a driver's seat 3 disposed in a front part within the vehicle cabin 2, and seats for a plurality of passengers (not shown) disposed further rearward in the vehicle cabin 2 with respect to the driver's seat 3. In the vehicle cabin 2, a wall portion 4 is fixed behind the driver's seat 3. The wall portion 4 includes a partition 5 and a frame structure 7 (not shown in FIG. 1; see FIG. 2) disposed in front of the partition 5. The partition 5 is formed of a hard resin material or a metal material. The partition 5 extends upward from the floor, is bent diagonally rearward at a slope part 6 located in the middle of the partition 5, and then extends upward again in an upper region above the slope part 6. The partition 5 serves as a boundary between an operation space S1 where the driver's seat 3 is disposed and a wheelchair space S2 where the wheelchair 80 can be placed.

The frame structure 7 is disposed adjacent and in front of the partition 5, and includes a combination of a plurality of pillars extending vertically and a plurality of frames extending laterally. The frame structure 7 supports the partition 5 and the driver's seat 3.

In the wheelchair space S2, a pipe-like edge handrail 9 extends along the length of the vehicle adjacent to an interior wall 8 disposed on the right edge of the wheelchair space S2. The edge handrail 9 is fixed, via brackets, to a vehicle body frame (not shown) disposed below the edge handrail 9, at a plurality of locations of the edge handrail 9 along its length. The lateral handrail 36 extending laterally and a vertical handrail 35 extending vertically are coupled together in a substantially L shape on the back of the partition 5. The vertical handrail 35 has a lower end fixed to a floor surface of the vehicle cabin 2. The lateral handrail 36 has a right end that is coupled with the edge handrail 9 or that is separate from the edge handrail 9 and fixed to the vehicle body frame, thereby being fixed within the vehicle cabin 2.

Figure 3:
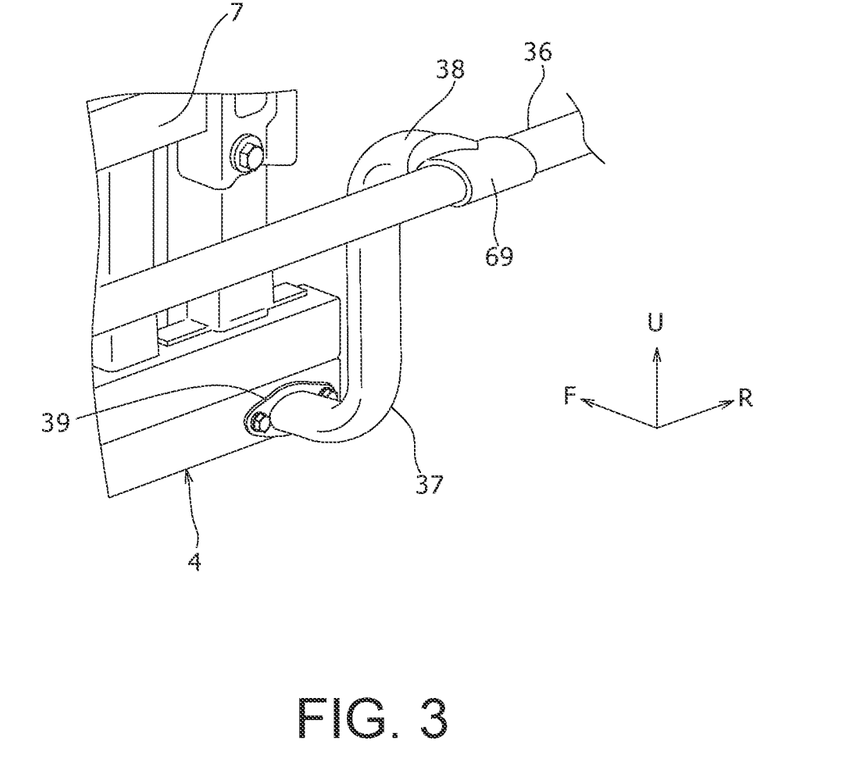
FIG. 3 is a perspective view of a portion of a lateral handrail, which is to be fixed, via a handrail reinforcing bracket, to a vehicle wall portion, with a partition being omitted.

FIG. 3 is a perspective view illustrating a portion of the lateral handrail 36 that is fixed, via a handrail reinforcing bracket 37, to the wall portion 4, with the partition 5 being omitted. The lateral handrail 36 is fixed to the wall portion 4 with the handrail reinforcing bracket 37 at an intermediate portion of the lateral handrail 36 in its extending direction or in the horizontal direction. The handrail reinforcing bracket 37 is a bent pipe having a substantially S shape, and is fixed between a front face of the lateral handrail 36 facing the wall portion 4, and the wall portion 4. The handrail reinforcing bracket 37 has a coupling end 38 to the lateral handrail 36, and the coupling end 38 extends along the vehicle length that is orthogonal to the extending direction of the lateral handrail 36. More specifically, the handrail reinforcing bracket 37 includes, at one end, a flange 39 that is screwed and fixed to the frame structure 7 of the wall portion 4, and the coupling end 38 of the handrail reinforcing bracket 37 is fitted and fixed in a receiving port of a T-shape joint 69 that extends from a fitting portion of the joint 69 orthogonally in the vehicle length direction. The fitting portion of the T-shape joint 69 is fixed to an intermediate portion of the lateral handrail 36 in its extending direction. The handrail reinforcing bracket 37 is fixed to the frame structure 7 through a hole 5a (see FIG. 2) in the partition 5.

A passenger can hold on to the edge handrail 9 to maintain their balance. The edge handrail 9 can also be used to secure the wheelchair 80 to the vehicle 1 with a first belt B1. The lateral handrail 36 is used for supporting the backrest 40, as will be described below.

Figure 4:
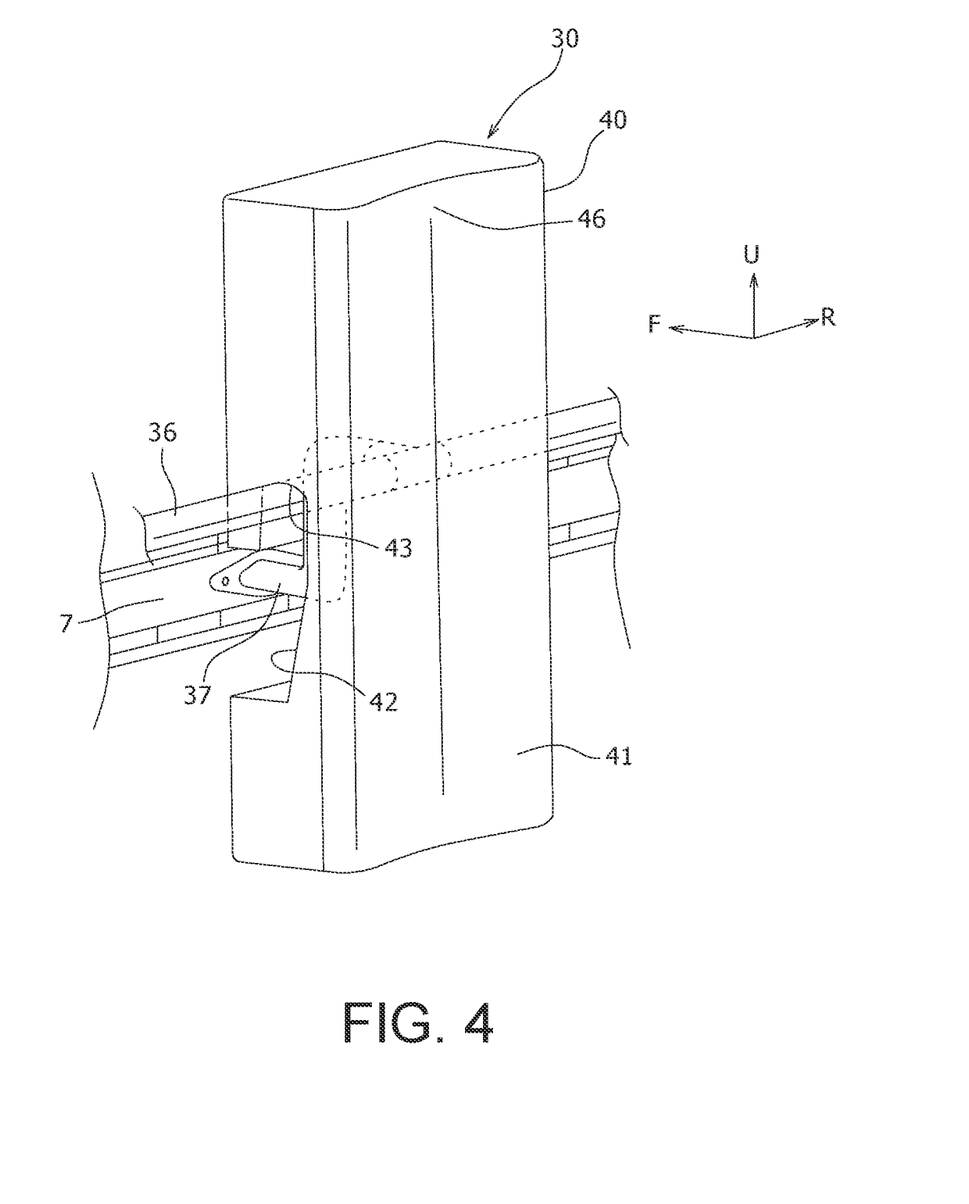
FIG. 4 is a perspective view of the backrest structure viewed from rearward of the vehicle.
Figure 5:
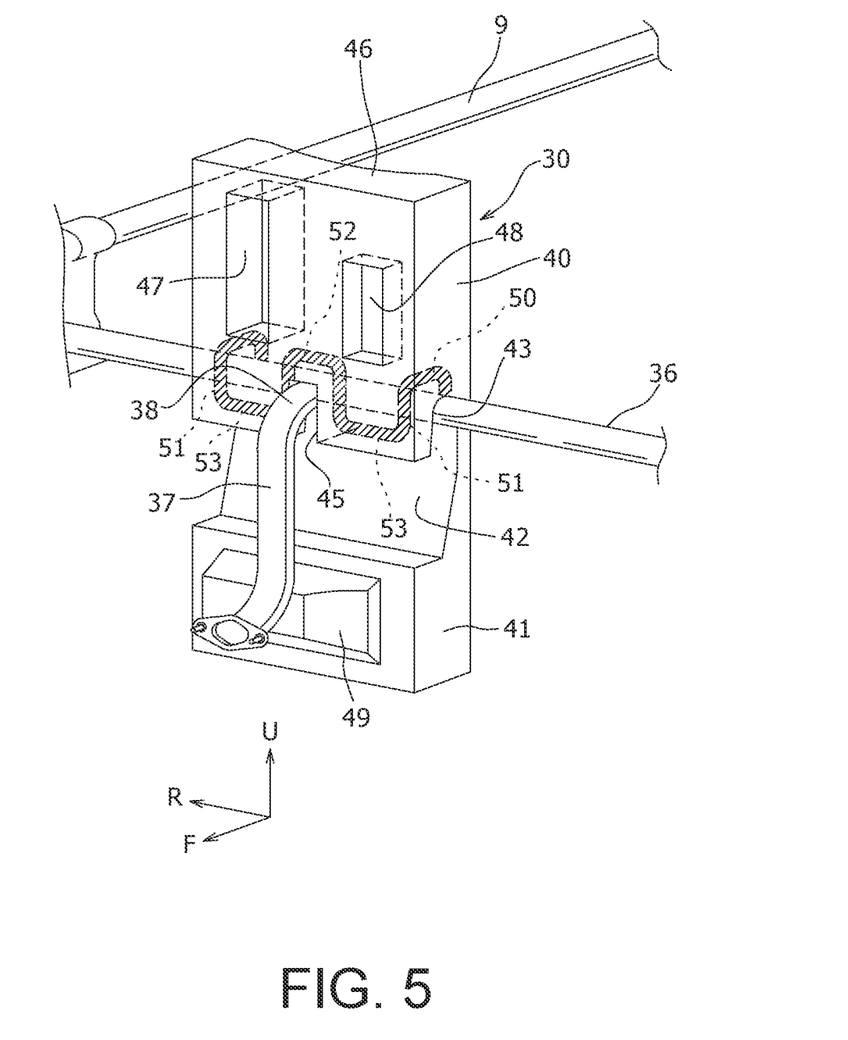
FIG. 5 is a perspective view of the backrest structure viewed from frontward of the vehicle.

Referring to FIG. 4 to FIG. 7, the backrest structure 30 includes the lateral handrail 36 and the backrest 40 described above. The backrest 40 has a cushion 41 and a reinforcing pipe 50 embedded within the cushion 41. FIG. 5 illustrates the reinforcing pipe 50 with a hatched portion. The cushion 41 has an elongated block shape and has, in the intermediate portion of a front face of the cushion 41 along its height, a channel portion 42 extending along the entire width of the cushion 41 in the horizontal direction. As will be described below, the position of the backrest 40 is fixed while the backrest 40 is supported on the lateral handrail 36.

The cushion 41 has a rear face that is curved inward, as a recess portion 46, toward the center in the lateral direction over the entire vertical length. This configuration simplifies fitting of the back portion 101 of the wheelchair user 100 to the recess portion 46 and thus prevents the back portion 101 from shifting to right and left with respect to the backrest 40. The "back portion" as used herein refers to the back of the wheelchair user 100 itself, or to a portion including the back and a backrest disposed on a back end of the wheelchair 80 against which the back of the wheelchair user 100 can be pressed.

The cushion 41 is formed of a soft material, such as a sponge member made of a foaming resin including a polyurethane, for example. The cushion 41 may have a sponge surface substantially entirely adhered with an elastic cover. For example, the cover may be woven from elastic yarns, such as polyurethane elastic fibers.

The channel portion 42 of the cushion 41 is opened at the front face and opposite side faces of the cushion 41, and has, at its upper end, a recessed part 43 extending horizontally. The recessed part 43 has a U-shape vertical cross section and is opened downward. As illustrated in FIGS. 4 and 5, the above configuration allows the lateral handrail 36 to fit inside the recessed part 43 to thereby removably support the backrest 40 on the lateral handrail 36.

The cushion 41 further includes, on its front side facing the wall portion, a bracket engaging slot 45 connecting a front end with the recessed part 43 of the cushion 41 along the vehicle length direction. The bracket engaging slot 45 has a cross section orthogonal to the vehicle length direction, having a U-shape opened downward, and extends along the vehicle length. Engagement of the coupling end 38 of the handrail reinforcing bracket 37 with the bracket engaging slot 45 prevents movement of the backrest 40 along the extending direction of the lateral handrail 36, as will be described below.

Figure 6:
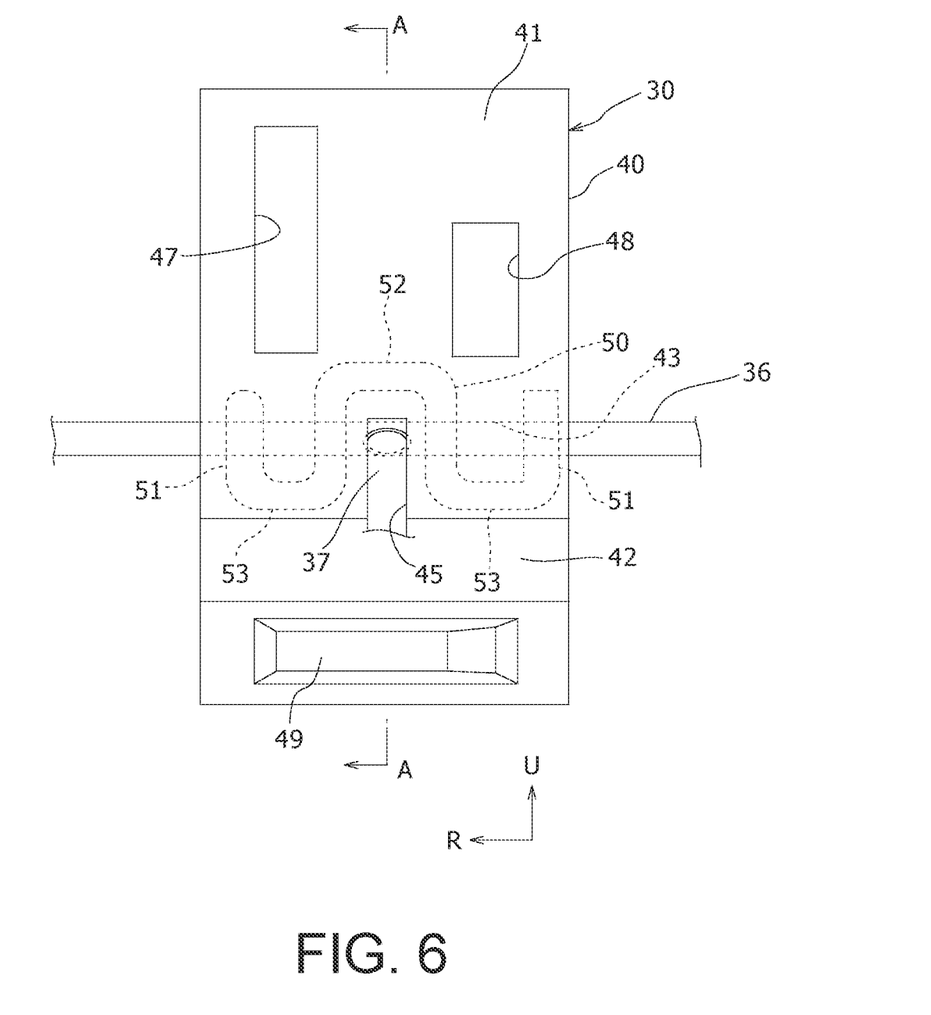
FIG. 6 illustrates the backrest structure viewed from frontward of the vehicle.
Figure 7:
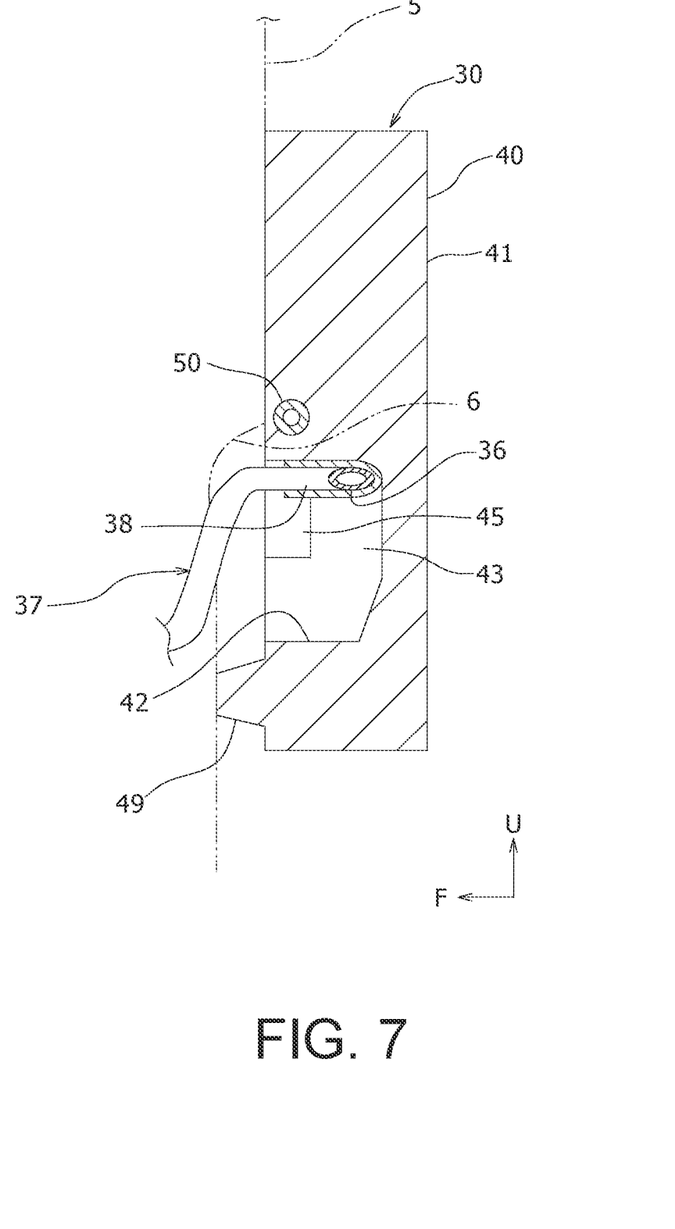
FIG. 7 is a cross section taken along A-A line in FIG. 6.

As illustrated in FIG. 5 to FIG. 7, the cushion 41 includes the reinforcing pipe 50 embedded adjacent to the inner surface of the recessed part 43. The reinforcing pipe 50 is a bent pipe made of a metal such as iron, and includes two first U-shape portions 51 at opposite ends, an intermediate second U-shape portion 52, and two line portions 53 connecting the first and second U-shape portions 51 and 52. The first U-shape portion 51 is opened downward such that it extends substantially along the inner surface of the recessed part 43 to extend over the recessed part 43. The first U-shape portion 51 having such a configuration helps the recessed part 43 maintain its shape. The recessed part 43 is then engaged with the lateral handrail 36 to prevent removal of the backrest 40 from the lateral handrail 36.

The second U-shape portion 52 is opened downward such that it extends substantially along the inner surface of the bracket engaging slot 45 to extend over the bracket engaging slot 45. The second U-shape portion 52 having such a configuration easily keeps the shape of the bracket engaging slot 45. The bracket engaging slot 45 is then engaged with the coupling end 38 of the handrail reinforcing bracket 37 to prevent removal of the bracket engaging slot 45 from the coupling end 38.

The cushion 41 further includes, in the upper portion on its front face, two storage portions 47 and 48 that are vertically elongated holes. One of the two storage portions 47 and 48 can store a first belt B1, which will be described below, that is used for fixing the wheelchair 80 onto the vehicle 1, and the other storage portion can store a second belt B2, which will be also described below, for fixing the wheelchair user 100 to the wheelchair 80, which is fixed to the vehicle 1. The cushion 41 further includes, in a lower portion on its front face, a protrusion 49 that extends outwardly to contact the wall portion 4.

When a wheelchair user 100 is going to board the vehicle 1, an employee of the bus service company, such as a driver, carries the backrest 40 to the wheelchair space S2 and places the backrest 40 on the lateral handrail 36 for support, before the wheelchair user 100 boards the vehicle 1. To place the backrest 40 on the lateral handrail 36, the lateral handrail 36 is first allowed to pass through the front end opening of the channel portion 42 of the backrest 40, and then the recessed part 43 is allowed to engage with the lateral handrail 36 from above. Simultaneously, the bracket engaging slot 45 is allowed to engage with the coupling end 38 of the handrail reinforcing bracket 37 from above. In this state, the opposite side ends of the coupling end 38 of the handrail reinforcing bracket 37 are in contact with the opposite lateral faces of the bracket engaging slot 45. The coupling end 38 is thus engaged with the bracket engaging slot 45 to prevent the backrest 40 from moving in the extending direction of the lateral handrail 36. This configuration therefore eliminates any requirement to install in the vehicle 1 dedicated components for preventing movement of the backrest 40 in the extending direction of the lateral handrail 36. Further, as the front side of the backrest 40 comes into contact with the rear side of the partition 5, the position of the backrest 40 supported on the lateral handrail 36 is fixed.

In this state, the wheelchair user 100 in the wheelchair 80 boards the vehicle 1 and the wheelchair space S2 facing towards the rear of the vehicle 1, and presses the back portion 101 against the backrest 40. The backrest 40 may receive the back of the wheelchair user 100 directly or via a backrest disposed on the wheelchair 80.

Then, with the right and left wheels 81 of the wheelchair 80 pressing against the lower portion side of the partition 5, a left armrest of the wheelchair 80 is fixed, via the first belt B1, to the edge handrail 9. Specifically, a ring portion disposed at one end of the first belt B1 is placed around the edge handrail 9 with a ring portion disposed on the other end of the first belt B1 being placed around the left armrest of the wheelchair 80, and the length of the first belt B1 is adjusted such that the first belt B1 is stretched between the edge handrail 9 and the wheelchair 80. Further, the second belt B2 is wound around the torso of the wheelchair user 100 passing through the outward of two, right and left, handle shafts 83 of the wheelchair 80 to secure the wheelchair user 100 to the wheelchair 80. The second belt B2 maintains the posture of the wheelchair user 100.

When no wheelchair user 100 is going to board the vehicle 1, the first and second belts B1 and B2, and the backrest 40 are detached from the vehicle 1 or the wheelchair 80, and the first and second belts B1 and B2 are stored in the storage portions 47 and 48 of the backrest 40, respectively. The backrest 40 is stored in a component chamber in the vehicle or in a storage facility of the bus service company, for example. The backrest 40 is thus removed from the wheelchair space S2 to allow the wheelchair space S2 to be occupied by multiple passengers, thereby achieving effective use of space within the vehicle cabin. In this state, passengers are able to grasp the lateral handrail 36 to maintain balance.

As described above, the backrest 40 of the backrest structure 30 having the cushion 41 is to be engaged with the lateral handrail 36 and can receive the back portion 101 of the wheelchair user 100. The backrest structure 30 can therefore alleviate the impact on the wheelchair user 100 with the backrest 40 even when vehicle motion is rapid and large, such as sudden stopping, of the vehicle 1. Further, the backrest 40 is simply liftable and removable from the lateral handrail 36, and is easily mountable on the lateral handrail 36 by simply engaging the recessed part 43 with the lateral handrail 36. This configuration simplifies attachment and detachment of the backrest 40 with respect to the vehicle 1. As the lateral handrail 36 can be used for securing the backrest 40 to the vehicle 1, there is no need for a specific component that secures the backrest 40 to the vehicle 1, thereby facilitating cost reduction for the backrest structure 30.

The backrest 40 is provided with the storage portions 47 and 48 that can store the first belt B1 for fixing the wheelchair 80 to the vehicle 1 and the second belt B2 for keeping the posture of the wheelchair user 100, respectively. The first belt B1 or the second belt B2, when not in use, can be stored in the storage portions 47 and 48, and the first and second belts B1 and B2 and the backrest 40 are stored together when no wheelchair user 100 is going board the vehicle 1. This configuration facilitates storage of the belt B1 and B2 and preparation for allowing the wheelchair user 100 to board the vehicle. When the storage portions 47 and 48 have different sizes as illustrated in FIG. 5, the longer of the belts B1 and B2 can be stored in the larger storage portion 47, and the shorter belt in the smaller storage portion 48.

While in the above example, the bracket engaging slot 45 is formed at the center of the backrest 40 in the lateral direction, the bracket engaging slot 45 may be formed toward the left or right end of the backrest 40.

Figure 8:
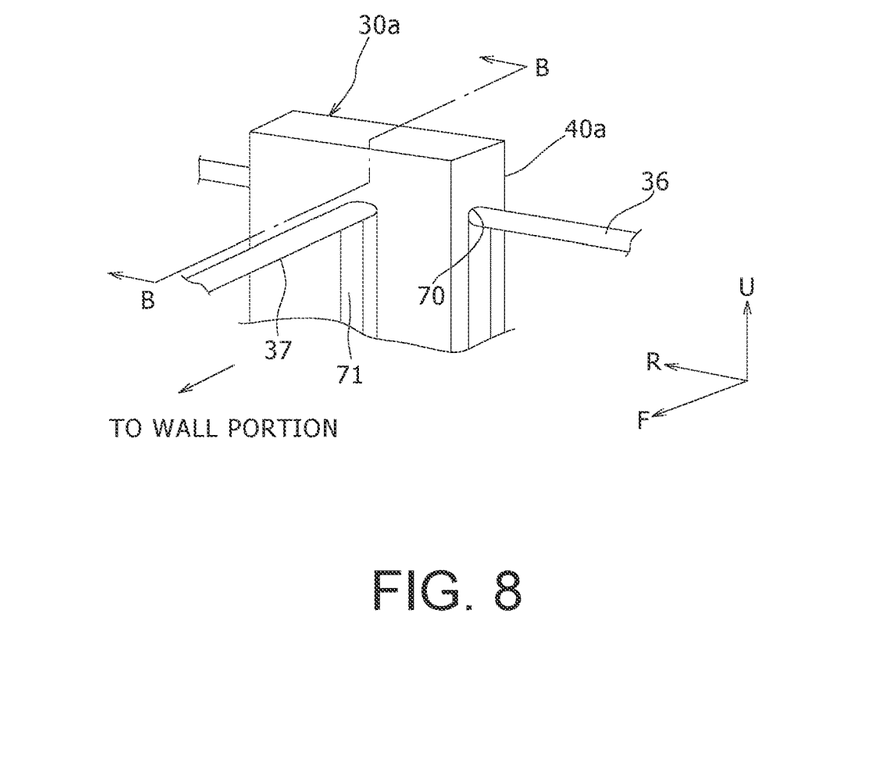
FIG. 8 is a perspective view of a backrest structure of another example embodiment of the disclosure with a lower portion of the backrest being omitted, viewed from frontward of the vehicle.
Figure 9:
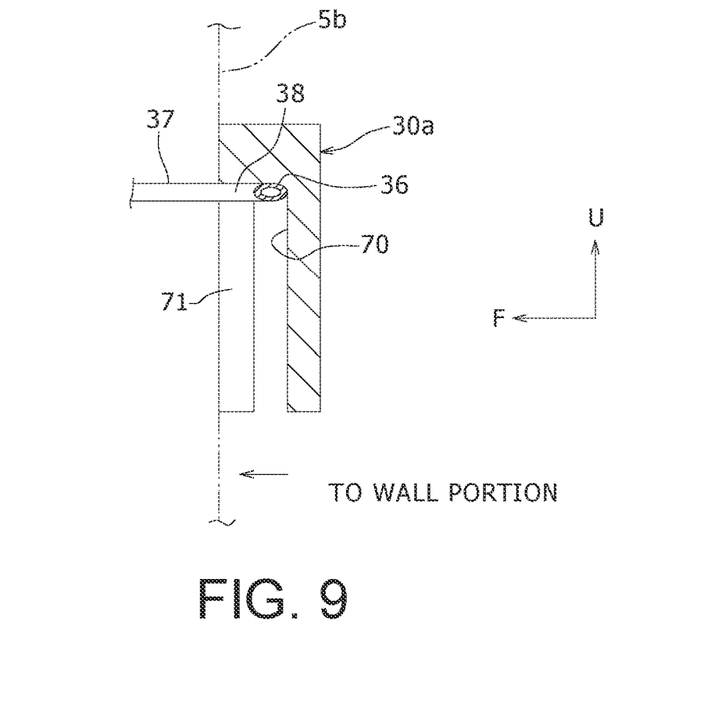
FIG. 9 is a cross section of the backrest structure of FIG. 8 taken along line B-B.

FIG. 8 is a perspective view of a backrest structure 30a according to another example embodiment viewed from frontward of the vehicle, with a lower portion of a backrest 40a being omitted. FIG. 9 is a cross sectional view of the backrest structure 30a taken along line B-B in FIG. 8. In this example configuration, the entire backrest 40a has a substantially U shape opening downward viewed from one side. Specifically, the backrest 40a has a recessed part 70 opening downward and is to be engaged with the lateral handrail 36. The backrest 40a is removably supported on the lateral handrail 36 at an upper portion of the recessed part 70. The backrest 40a further includes, on its front side corresponding to a side face facing a wall, a bracket engaging slot 71 that is open at its lower end and connects a front end of the backrest 40a with the recessed part 70 along the vehicle length direction. The bracket engaging slot 71 has a vertically elongated U shape when the backrest 40 is viewed from frontward.

To engage the backrest 40a with the lateral handrail 36, the recessed part 70 of the backrest 40a is allowed to engage with the lateral handrail 36 from above, while the bracket engaging slot 71 of the backrest 40a is allowed to engage, from above, the coupling end 38 extending, from the lateral handrail 36, along the vehicle length orthogonal to the extending direction of the lateral handrail 36. In this example, the rear side of a partition 5b extends vertically, and the front side of the backrest 40a comes into contact with this rear side of the partition 5b. The storage portions for storing belts are disposed in a lower portion of the backrest 40a that is not shown. This example configuration further simplifies the shape of the backrest 40a. Other features and operations of this example are similar to those illustrated in FIG. 1 to FIG. 7.

In a further example configuration, the backrest 40 or 40a may include any one or two of the reinforcing pipe, the bracket engaging slot, or the storage portions.

While in each example described above, the boarded wheelchair user 100 in the wheelchair 80 faces towards the rear of the vehicle 1, the disclosure is not limited to this configuration, and the boarded wheelchair user in the wheelchair may face frontward or in a vehicle width direction. In this case, as in each of the examples described above, the backrest is supported on the lateral handrail with the recessed part being engaged with the lateral handrail extending horizontally. When the boarded wheelchair user faces along the vehicle width direction, for example, the edge handrail extending along the vehicle length corresponds to the lateral handrail, and the recessed part of the backrest is engaged with the edge handrail for supporting the backrest.

The invention claimed is:

1. A vehicle backrest structure comprising:
   a lateral handrail fixed within a cabin of a vehicle, the lateral handrail extending horizontally; and
   a backrest having a cushion formed of a soft material, the backrest configured to receive a back portion of a wheelchair user in a wheelchair that is supported within the cabin of the vehicle,
   wherein the backrest has a recessed part that is opened downward and that is to be engaged with the lateral handrail, the backrest configured to be removably supported on the lateral handrail, and
   wherein the backrest includes a reinforcing pipe embedded within the cushion and having a downwardly-opened shape along an inner face of the recessed part.

2. The vehicle backrest structure according to claim 1, further comprising:
   a handrail reinforcing bracket configured to be fixed between a side face of the lateral handrail facing a wall portion of the vehicle and the wall portion, the handrail reinforcing bracket having a coupling end with respect to the lateral handrail, the coupling end extending in a direction orthogonal to an extending direction of the lateral handrail,
   the backrest has a bracket engaging slot having an opened lower end at a portion to face the wall portion to connect a side end of the backrest to face the wall portion with the recessed part of the backrest, the bracket engaging slot configured to be engaged with the coupling end of the handrail reinforcing bracket.

3. The vehicle backrest structure according to claim 1, wherein
   the backrest includes a storage portion configured to store a belt that fixes the wheelchair.

4. A vehicle backrest structure comprising:
   a lateral handrail fixed within a cabin of a vehicle, the lateral handrail extending horizontally;
   a handrail reinforcing bracket configured to be fixed between a side face of the lateral handrail facing a wall portion of the vehicle and the wall portion, the handrail reinforcing bracket having a coupling end with respect to the lateral handrail, the coupling end extending in a direction orthogonal to an extending direction of the lateral handrail; and
   a backrest having a cushion formed of a soft material, the backrest configured to receive a back portion of a wheelchair user in a wheelchair that is supported within the cabin of the vehicle,
   wherein the backrest has a recessed part that is opened downward and that is to be engaged with the lateral handrail, the backrest configured to be removably supported on the lateral handrail, and
   wherein the backrest has a bracket engaging slot having an opened lower end at a portion to face the wall portion to connect a side end of the backrest to face the wall portion with the recessed part of the backrest, the bracket engaging slot configured to be engaged with the coupling end of the handrail reinforcing bracket.

5. A vehicle backrest structure comprising:
   a lateral handrail fixed within a cabin of a vehicle, the lateral handrail extending horizontally; and
   a backrest having a cushion formed of a soft material, the backrest configured to receive a back portion of a wheelchair user in a wheelchair that is supported within the cabin of the vehicle,
   wherein the backrest has a recessed part that is opened downward and that is to be engaged with the lateral handrail, the backrest configured to be removably supported on the lateral handrail, and
   wherein the backrest includes a storage portion configured to store a belt that fixes the wheelchair.

* * * * *